(No Model.)

R. H. HAYES.
CUSHION TIRE.

No. 584,935. Patented June 22, 1897.

Attest
C. S. Middleton
R. E. Durand

Inventor
Rebecca Henry Hayes
by Walter Donaldson & Co
Atty

UNITED STATES PATENT OFFICE.

REBECCA HENRY HAYES, OF GALVESTON, TEXAS.

CUSHION-TIRE.

SPECIFICATION forming part of Letters Patent No. 584,935, dated June 22, 1897.

Application filed September 15, 1896. Serial No. 605,899. (No model.)

*To all whom it may concern:*

Be it known that I, REBECCA HENRY HAYES, a citizen of the United States, residing at Galveston, in the county of Galveston and State of Texas, have invented certain new and useful Improvements in Cushion-Tires, of which the following is a specification, reference being had therein to the accompanying drawings.

My invention relates to improvements in tires for bicycles; and the object of the invention is to produce a tire which shall be very resilient, but which shall be free from the liability to collapse which makes the ordinary pneumatic tire so objectionable, and which is especially adapted for long excursions and for army and police bicycles and to the wheels of vehicles of any kind using rubber tires.

The invention is illustrated in the accompanying drawings, in which—

Figure 1:
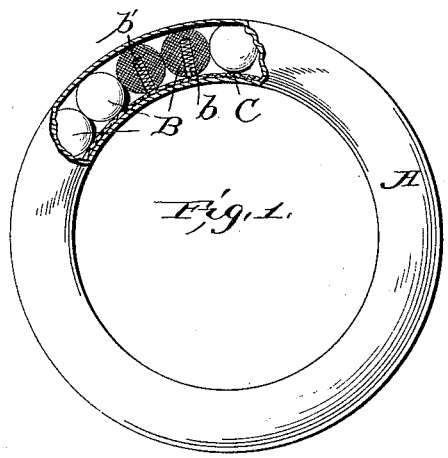
Figure 2:
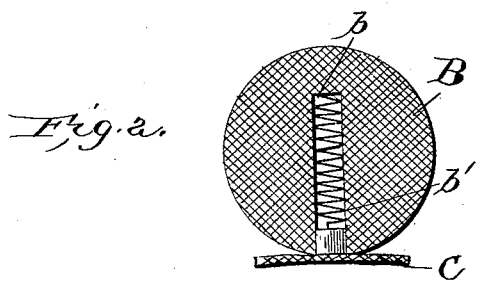
Figure 3:
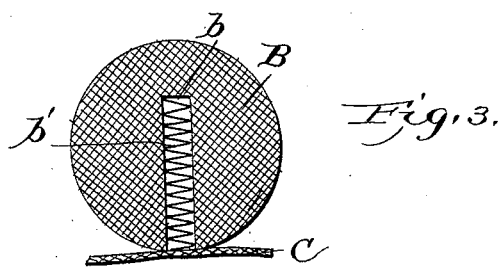

Figure 1 is a sectional view of a portion of a tire constructed in accordance with my invention. Fig. 2 is an enlarged detail of a modification. Fig. 3 is an enlarged detail view.

In the drawings the tire tube or covering is shown at A, which may be of any suitable material—such, for instance, as the outer tube or covering of an ordinary double-tube pneumatic tire, or a single-tube tire with an opening to receive the balls hereinafter described, or a tube specially constructed for the purpose. Within this tube I place a series of balls B, made of soft rubber having any degree of resisting force required, each ball having a channel *b* centrally therein which receives a spring B' to make the ball more resilient. The balls are arranged within the tube side by side closely pressed together, with the springs extending in a radial line of the wheel, so that as each ball approaches the ground in the revolution of the wheel the spring therein will assume a vertical position.

In order to facilitate the insertion of the balls within the tube and in order to hold the springs in a radial line of the wheel, I connect them by a rubber tape C, to which each ball is cemented at the point where the spring is inserted in the ball, the tape thus serving the double purpose of connecting the balls and holding the springs firmly within their recesses. The tape, with the plurality of balls attached, may thus be readily inserted within the tube in the same manner that an inner tube is put into its outer casing in the ordinary pneumatic tire.

Having thus described my invention, what I claim is—

1. A cushion-tire comprising the endless tube, the plurality of elastic balls therein, the tape connecting the exterior of said balls and supplemental resilient means inserted in said balls, substantially as described.

2. A cushion-tire comprising the endless tube, the plurality of balls therein, springs embedded in said balls, and the tape connecting said balls, substantially as described.

3. A cushion-tire comprising the endless tube, the plurality of balls therein, helical springs seated in recesses in said balls, and means for retaining said balls in a position with the springs extending radially of the wheel, substantially as described.

4. A cushion-tire comprising the endless tube, the plurality of balls therein, helical springs seated in recesses in said balls, and the tape cemented to said balls and covering the openings containing the springs whereby said tape not only connects the balls but holds the springs in place therein, substantially as described.

In testimony whereof I affix my signature in presence of two witnesses.

REBECCA HENRY HAYES.

Witnesses:
SYDNEY E. SPANN,
W. B. FRANKLIN.